Sept. 9, 1930.  J. B. KNEIP  1,775,563
POSITION FINDER
Filed June 20, 1929

WITNESSES
Lowell C. Weinberg.

INVENTOR
John Boniface Kneip

Patented Sept. 9, 1930

1,775,563

UNITED STATES PATENT OFFICE

JOHN BONIFACE KNEIP, OF SEATTLE, WASHINGTON

POSITION FINDER

Application filed June 20, 1929. Serial No. 372,442.

My invention relates to an improvement in the markings on the hub and blades of an aircraft propeller of the detachable blade type, so that the settings of the pitch angle of the blades can be determined by direct reading and a change in this setting can be easily and accurately made.

It has been common practice to mark the hub end of blades of a detachable blade type aircraft propeller with a small arrow or other indicating mark on the circumference, in such a manner that it will register with very closely spaced markings on the flange of the propeller hub. The markings on the propeller flange generally represent a blade pitch angular distance of 1 degree and are so close together that it is quite impossible to get the correct blade pitch angular setting of all blades without recourse to setting the propeller hub with blades assembled on a surface plate and measuring pitch angle with protractors or other means. This procedure entails removing the propeller from the airplane and requires quite an amount of time, labor, and expense.

The purpose of this invention is to make provision for a system of markings on the blades and hub of an aircraft propeller of the detachable blade type that will register with each other and indicate the blade pitch angular setting accurately to about ¼ or ½ degree; and also that will allow this blade pitch angular setting to be changed to any desired setting and accurately set at this angle without removing the propeller from an engine or of having recourse to a surface plate and protractors and other measuring instruments.

The system of markings used in this invention are lines on the surface of the hub and on the propeller blades immediately adjacent to the propeller hub flange when blades are assembled, and of numerals stamped near these lines indicating the blade pitch angle that the line represents.

Having thus generally described my invention and pointed out the improvements and special features provided, as illustrated in the accompanying drawings, reference is made thereto, in which.

Figure 1:
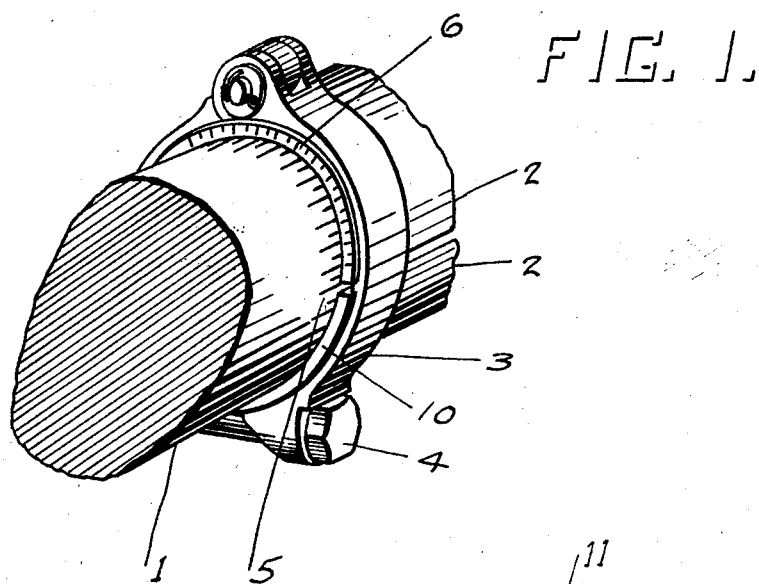
Fig. 1 is a perspective view of a portion of an aircraft propeller of the detachable blade type, showing a blade assembled in the hub and the pitch angular markings on each.
Figure 2:
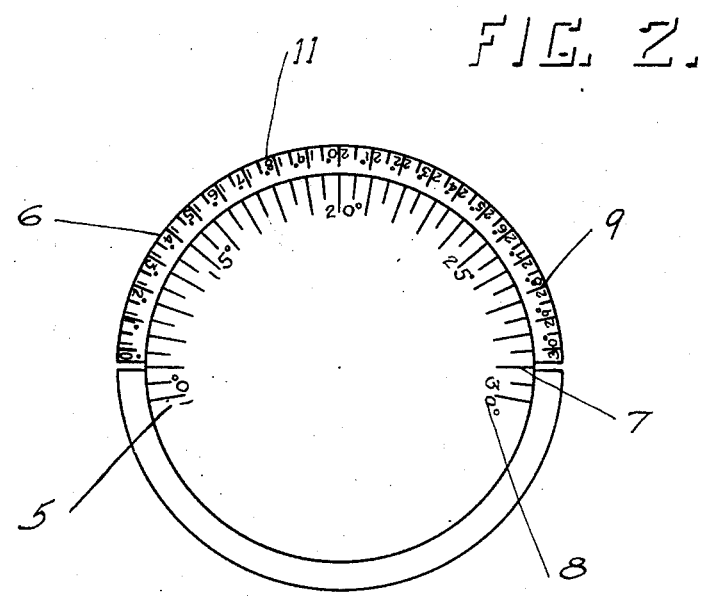
Fig. 2 is a diagrammatic arrangement of the pitch angular markings, showing their relation to each other.

Referring more particularly to the different parts of the figures of the drawings by reference numerals, 1 is the hub end of the propeller blade shown clamped in the halves 2 of the propeller hub blade socket, by ring clamp assembly 3, and the bolt 4. Propeller blade pitch angular markings, or scale 5, register with the propeller hub markings, or scale 6, and thereby indicate the pitch angular settings of the propeller blade. The propeller blade markings, or scale 5, comprise a series of equally spaced lines 7, drawn on the surface of the hub end 1 of the propeller blade, approximately parallel with the axis of the propeller hub halves 2, and numerals 8, stamped near the lines 7, designating the blade pitch angle corresponding to that particular line 7.

The propeller hub markings, or scale 6, comprise a series of radial equally spaced lines 9, stamped on the end 10 of the propeller hub halves 2, and numerals 11, stamped near the lines 9, designating the blade pitch angle corresponding to that particular line 9.

The lines 7 are of two different lengths, the longer denoting degrees of blade pitch angle and the shorter denoting half-degrees. In the same manner, the lines 9 are of two different lengths, the longer denoting degrees of blade pitch angle and the shorter denoting half-degrees. Most propeller pitch angles used in practice will fall between 10 and 30 degrees. Therefore, for the sake of representation herein, that range has been selected for illustration. With this range of propeller pitch angles it is convenient to consider the actual distance between the longer lines 9 on the hub equal to an actual angular measurement of 9 degrees. With the actual angular distance between lines 9 on scale 6 equal to 9 degrees, it is necessary to make the actual distance between lines 7 on scale 5 greater by 1 degree, or equal to 10 degrees. It is essential that the actual angular distance between lines 7 on scale 5 be greater by 1 degree than the actual angular distance between lines 9 on scale 6. However, this angular distance can be any convenient number, considering a possible range of different propeller pitch angular settings and the circumference of the hub end 10.

The scale 6 on propeller hub socket end 10 may cover any required portion of that surface, but the scale 5 on propeller hub end 1 must be so located with respect to scale 6 on the propeller hub, that when lines 9 of scale 6, and lines 7 of scale 5 register with each other, the pitch angular setting indicated by the numerals stamped near these lines must equal the actual blade pitch angular setting of the propeller. In setting the blades of an aircraft propeller, it is customary to measure the pitch angle at a distance of 42" from the center of the hub, by use of a protractor or triangular measurements. In marking scale 5 on the propeller blade 1, this same method of setting the blades would be necessary throughout the entire range of pitch angles represented by the scales 5 and 6. However, with the scales 6 and 5 correctly stamped on the hub socket end 10, and the propeller blade end 1, with respect to each other and to the blade pitch angle, it is readily seen that any blade pitch angular setting between 10 and 30 degrees can be quickly secured simply by turning the propeller blade until lines 6 and 7 denoting the desired blade pitch angle, register one with the other, according to the numerals stamped.

Having thus described my invention generally and in detail, what I claim is as follows:

1. On an aircraft propeller of the detachable blade type, a set of equally spaced markings on the hub end of the propeller blade, and a set of equally spaced markings on the propeller hub blade socket flange, the set of markings on the propeller hub comprising of a number of equally spaced radial lines, some of them being long and others short, the longer denoting the blade pitch angular setting by degrees, the shorter by half-degrees; the set of markings on the hub end of the propeller blade being equally spaced and approximately parallel to the center line of the propeller hub blade sockets and comprising lines of different length, the longer denoting propeller blade pitch angle in degrees, the shorter in half-degrees.

2. On an aircraft propeller of the detachable blade type, a set of equally spaced markings on the hub end of the propeller blade, and a set of equally spaced markings on the propeller hub blade socket flange, each set of markings comprising of equally spaced long and short lines, the longer lines denoting a blade pitch angular setting of 1 degree, and the shorter of ½ degree, numerals stamped near the longer lines of said sets of markings, said numerals so stamped as to denote the blade pitch angular setting to which they correspond; the distance between the longer lines on the sets of markings stamped on the hub end of the propeller blade greater by an actual angular measurement of 1 degree than the distance between the actual angular measurement between the longer lines of the markings on the propeller hub blade socket end.

3. On an aircraft propeller of the detachable blade type, a set of equally spaced markings on the hub end of the propeller blade, and a set of equally spaced markings on the propeller hub blade socket flange, each set of markings comprising of equally spaced long and short lines, the longer lines denoting a blade pitch angular setting of 1 degree, and the shorter of ½ degree, the relation between the longer lines of each scale, one with the other, and also with the actual blade pitch angular setting, of such a nature that the numerals stamped near the longer lines of said sets of markings will correspond, one with the other, and also with the number of degrees of the actual blade pitch angular setting, so that the actual setting of the blade pitch angle can be readily determined by visual observation, and so that a different setting of the blade pitch angle can be easily and accurately set simply by turning the propeller blade until the lines of each scale, near which the numeral representing the desired pitch angle is stamped, register, one with the other.

In testimony whereof I have hereunto set my hand this 15th day of June, 1929.

JOHN BONIFACE KNEIP.